(12) United States Patent  (10) Patent No.: US 8,719,894 B2
McClain et al.  (45) Date of Patent: May 6, 2014

(54) FEDERATED ROLE PROVISIONING

(75) Inventors: Carolyn B. McClain, Springville, UT (US); Bruce L. Bergeson, Ameican Fork, UT (US); Vernon Roger Holm, Sandy, UT (US)

(73) Assignee: Apple Inc., Cupertino, CA (US)

( * ) Notice: Subject to any disclaimer, the term of this patent is extended or adjusted under 35 U.S.C. 154(b) by 1133 days.

(21) Appl. No.: 11/693,155

(22) Filed: Mar. 29, 2007

(65) Prior Publication Data

US 2008/0244687 A1  Oct. 2, 2008

(51) Int. Cl.
*H04L 29/06* (2006.01)
(52) U.S. Cl.
USPC .................................. 726/1; 726/4
(58) Field of Classification Search
USPC ........................... 726/1, 4; 706/27
See application file for complete search history.

(56) References Cited

U.S. PATENT DOCUMENTS

| | | | |
|---|---|---|---|
| 5,329,626 | A | 7/1994 | Klein et al. |
| 5,826,239 | A | 10/1998 | Du et al. |
| 6,023,765 | A | 2/2000 | Kuhn |
| 6,067,548 | A | 5/2000 | Cheng |
| 6,088,679 | A | 7/2000 | Barkley |
| 6,202,066 | B1 | 3/2001 | Barkley et al. |
| 6,947,989 | B2 | 9/2005 | Gullotta et al. |
| 6,985,955 | B2 | 1/2006 | Gullotta et al. |
| 2002/0147801 | A1 | 10/2002 | Gullotta et al. |
| 2002/0156904 | A1 | 10/2002 | Gullotta et al. |
| 2002/0169876 | A1 | 11/2002 | Curie et al. |
| 2002/0188869 | A1 * | 12/2002 | Patrick ........................... 713/201 |
| 2004/0162906 | A1 * | 8/2004 | Griffin et al. .................. 709/229 |
| 2005/0125509 | A1 | 6/2005 | Ramachandran |
| 2005/0193196 | A1 | 9/2005 | Huang et al. |
| 2006/0089932 | A1 * | 4/2006 | Buehler et al. ..................... 707/9 |
| 2007/0157297 | A1 * | 7/2007 | Patrick ................................ 726/6 |
| 2007/0283443 | A1 * | 12/2007 | McPherson et al. ............ 726/26 |
| 2008/0256610 | A1 * | 10/2008 | Patrick ............................... 726/4 |

OTHER PUBLICATIONS

Sandhu, R., Ferraiolo, D.F. and Kuhn, D.R. (Jul. 2000). "The NIST Model for Role-Based Access Control: Toward a Unified Standard". 5th ACM Workshop Role-Based Access Control. pp. 47-63.*
"European Application Serial No. 08102531.4 Extended European Search Report", 6 pgs.
Belsis, Petros, et al., "A scalable security architecture enabling coalition formation between autonomous domains", Proceedings of the Fifth IEEE International Symposium on Signal Processing and Information Technology, Dec. 18-21, 2005, XP010881068, pp. 560-565.

* cited by examiner

*Primary Examiner* — Brandon Hoffman
*Assistant Examiner* — Thong Truong
(74) *Attorney, Agent, or Firm* — Blakely, Sokoloff, Taylor & Zafman LLP (57) ABSTRACT

In various embodiments, techniques for federated role provisioning are provided. A federated role definition for a resource is constructed and distributed. The federated role definition includes a role hierarchy having role assignments and constraints for dynamically resolving and binding a resource to particular ones of the role assignments. A resource may have role assignments statically bound to its identity and dynamically bound to its identity. Furthermore, some role assignments may be inherited from the role hierarchy.

22 Claims, 3 Drawing Sheets

FEDERATED ROLE PROVISIONING

FIELD

The invention relates generally to security and more particularly to techniques for federated role provisioning.

BACKGROUND

Increasingly enterprises are faced with numerous internal users having different access requirements that span a large number of applications, networks, and systems. Maintaining the security of such modern dynamic enterprises is a critical and challenging task. In some industries, such as banking, the federal government has promulgated rules and regulations that require a certain degree of security. Thus, enterprises are not only concerned with their reputation but face potential civil liability for security breaches. The challenge lies in efficiently and securely provisioning system access to reflect constantly changing user responsibilities and computing environments.

Historic methods of manually granting individual user access on a resource by resource basis long ago proved administratively infeasible for organizations of even moderate size. Role Based Access Control (RBAC) systems advanced the art by attempting to secure and streamline user administration via constructing and maintaining a formal model of user privileges grouped into roles.

One problem with RBAC systems is that one RBAC for one enterprise may be entirely different than another RBAC for a different enterprise. Moreover, disparate enterprises are increasingly collaborating and partnering on the Internet to share resources, revenues, customers, expenses, etc. One impediment to seamless integration and collaboration lies in each different enterprise's security system or RBAC system. Often the solution to integration is a large-scale development effort that makes the two RBAC compatible with one another or that installs a single RBAC for both enterprises. However, such a development effort can prove too costly and time consuming and may even negate any perceived benefits of the two enterprises collaborating and integrating with one another. Consequently, security integration remains a significant development exercise and financial concern with cross enterprise collaboration and integration.

Accordingly, what are needed are mechanisms to better provision security roles for users.

SUMMARY

In various embodiments, techniques for federated role provisioning are provided. More specifically, and in an embodiment, a method is provided for generating and distributing a federated role definition. A role request is received from a service provider. The role request is associated with a resource interacting within a remote environment of the service provider. Metadata is generated representing a role hierarchy having role assignments and constraints for dynamically resolving each of the role assignments. Finally, the metadata is sent to the service provider in the remote environment for the service provider to use to dynamically resolve and bind each of the role assignments for the resource for purposes of defining access of the resource within the remote environment.

DETAILED DESCRIPTION

The term "resource" as used herein refers to an electronic entity, an application or set of applications, a data store, a user, a proxy, a directory, a service, or physical devices such as computers or peripherals etc. Resources may represent physical or logical entities.

In various embodiments of the invention, the term "identity" is used. An identity refers to an electronic identifier, attribute, or representation for a resource (e.g., physical and logical). An identity may be assigned to a resource after authentication. An identity is authenticated via various techniques (e.g., challenge and response interaction, cookies, assertions, etc.) that use various identifying information (e.g., identifiers with passwords, biometric data, digital certificates, digital signatures, etc.). A "true identity" is one that is unique to a resource across any context that the resource may engage in over a network (e.g., Internet, Intranet, etc.). However, each resource may have and manage a variety of identities, where each of these identities may only be unique within a given context (given service interaction, given processing environment, given virtual processing environment, etc.).

"Role Based Access Control" (RBAC) is a technique that specifies role relations, interactions, and restrictions as a part of a role object model. Stated another way, RBAC is a security model to administer system access rights based on role assignments and rules (role policy). Roles are a mechanism for managing many to many relationships. In RBAC, many resources are mapped to a role and many permissions are mapped to a role; thereby, simplifying management of the many to many relationship of resources to permission/access rights.

An "identity service" refers to a special type of service that is designed to manage and supply authentication services and authentication information for resources. So, an identity service may authenticate a given resource for access to a variety of local and external services being managed by that identity service. A single resource may have multiple identity services. In addition the identity service itself may be viewed as a type of resource. In this manner, identity service may authenticate and establish trust with one another viewing one another as specific type of resource.

According to an embodiment, some example identity services are described in "Techniques for Dynamically Establishing and Managing Authentication and Trust Relationships," filed on Jan. 27, 2004, and having the U.S. Ser. No. 10/765,523; "Techniques for Establishing and Managing a Distributed Credential Store," filed on Jan. 29, 2004, and having the U.S. Ser. No. 10/767,884; and "Techniques for Establishing and Managing Trust Relationships," filed on Feb. 3, 2004, and having the U.S. Ser. No. 10/770,677; all of which are commonly assigned to Novell, Inc., of Provo, Utah and the disclosures of which are incorporated by reference herein.

The terms "remote" and "local" are used throughout this disclosure. These terms are relative terms that define a particular resource as being local or remote to another resource. Something is considered remote if that something exists over a wide area network (WAN) in a different environment entirely from that of something else to which it is being compared.

Various embodiments of this invention can be implemented in existing network architectures and RBAC systems. For example, in some embodiments the techniques presented herein are implemented in whole or in part in the Novell® network, proxy server products, operating system products, data center products, and/or directory services products distributed by Novell®, Inc. of Provo, Utah. More specifically, embodiments of the invention may be implemented in the Novell® Access Manager, Identity Manager Products, and Bandit projects among others.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-4.

Figure 1:
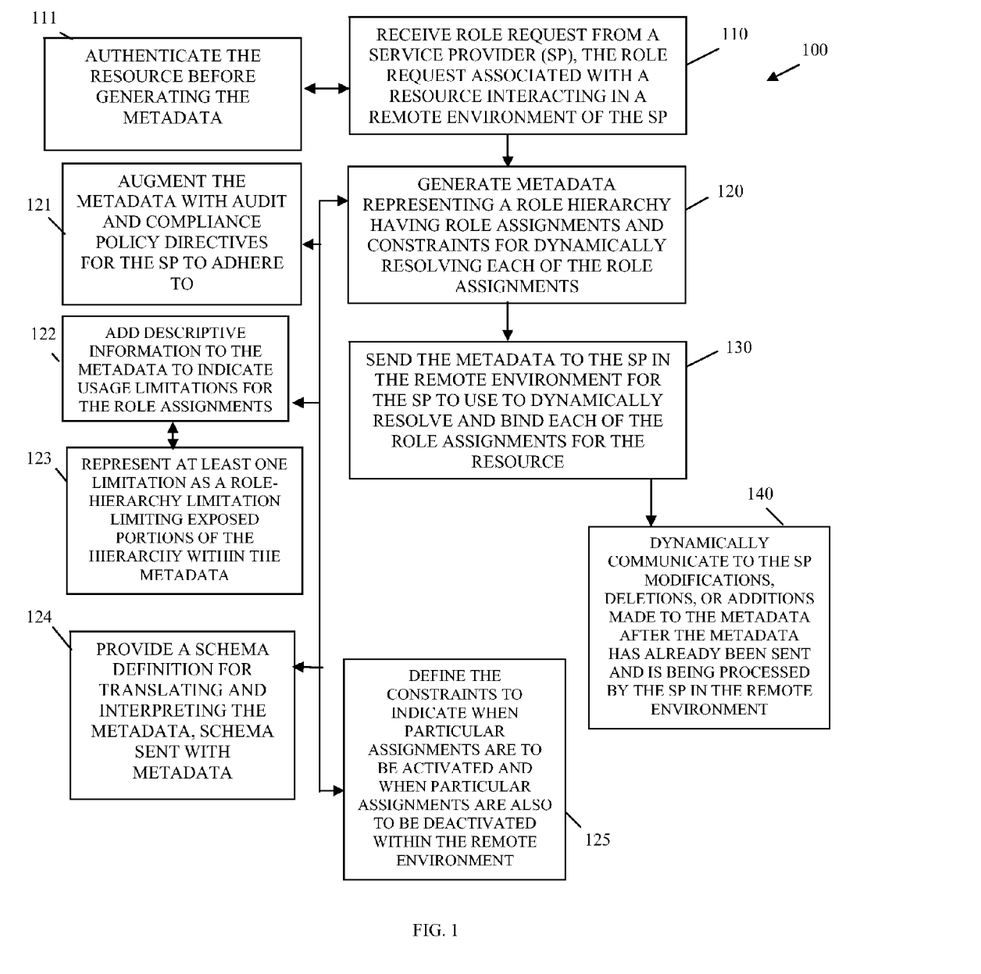
FIG. 1 is a diagram of a method for generating and distributing a federated role definition for a resource, according to an example embodiment.

FIG. 1 is a diagram of a method 100 for generating and distributing a federated role definition for a resource, according to an example embodiment. The method 100 (hereinafter "federated role-defining service") is implemented as instructions in a machine-accessible and readable medium. The instructions when executed by a machine perform the processing depicted in the FIG. 1. The federated role-defining service is also operational over and performs within a network. The network may be wired, wireless, or a combination of wired and wireless.

According to an embodiment, the features and processing of the federated role-defining service are integrated and incorporated within an enhanced version of an identity service. Examples of some identity services that may be enhanced to include the features of the federated role-defining service were supplied and incorporated by reference above.

At 110, the federated role-defining service receives a role request from a service provider. The service provider may itself be a version or instance of an identity service. The service provider processes within a remote environment from the federated role-defining service and is accessible over a wide area network (WAN), such as the Internet. The service provider initially makes a role request to the federated role-defining service on behalf of a resource operating or interacting within the remote environment of the service provider. Again, the resource may be a user or an automated service or program, etc.

According to an embodiment, at 111, the federated role-defining service may also provide authentication services for the service provider, such that the resource is authenticated before any role information or metadata (discussed below) are produced or generated.

At 120, the federated role-defining service generates metadata representing a role hierarchy having role assignments and constraints for dynamically resolving each of the role assignments. The metadata may be in a variety of formats, such as but not limited to eXtensible Access Control Markup Language (XACML) associated with eXtensible Markup Language (XML), etc. Liberty Alliance statements or communications may be used as well to communicate the metadata. In fact, even a proprietary format may be used as long as it is consistent.

The role hierarchy includes higher-level role assignments or names and lower-level role assignments. A lower-level role assignment may inherit a higher-level role assignment by virtue of its association with the higher-level role assignment. For example, consider a role assignment identified as manager within a role hierarchy. A manger role or role assignment includes certain access rights to resources or assets of an enterprise. The enterprise may also include a developer role or role assignment that can be a lower level role within a role hierarchy underneath the manager role, such that by virtue of being associated with a manager role assignment a user (resource) may also inherit and be associated with a developer role assignment. The role hierarchy is dynamically acquired for a given resource by the federated role-defining service when a service provider makes a request. Policy for the given resource and an enterprise may drive the role hierarchy that is assembled. Each feasible role that the resource may obtain according to policy can be represented within the role hierarchy.

It is noted that the role hierarchy includes role names or assignments, such as manager, employee, developer, guest, visitor, etc. These role names and assignments and their associations with one another to form the role hierarchy is driven by policy and is assigned and provided by the federated role-defining service for a specific resource. However, the role assignments included within the role hierarchy do not mean that the resource is automatically permitted to assume those particular roles or assignments. In other words, an identity associated with the resource must be bound to a particular role or role assignment before the access permissions, privileges, and limitations for that particular role inures to the resource. Accordingly, each role assignment may have a variety of constraints defined within the role hierarchy.

The constraints may be viewed as rules or even more policies that can be dynamically evaluated by the service provider within the remote environment. The metadata then includes a role hierarchy having multiple role assignments or roles, the activation of which is determined by compliance with the role constraints also included in the metadata.

In an embodiment, at 121, the metadata may be further augmented by the federated role-defining service with audit and compliance policy directives that the service provider is to adhere to in the remote environment. The audit and compliance directives may instruct the service provider on what types of events and information to track with respect to actions of the resource within the remote environment and roles that the resource assumes or uses. The audit and compliance directives may also instruct the service provider on what (type of information and level of detail) is to be reported; how it is to be reported, to whom it is to be reported and when it is to be reported.

According to still another embodiment, at 122, the federated role-defining service may add descriptive information to the metadata to indicate in plain English the usage limitations for any given role assignment. In other words, a role assignment of manager may include a description that says capable of accessing the employee salary database. This descriptive information would aid administrators in determining and debugging role assignments and usage.

In some situations, at 123, the federated role-defining service may use a security policy to include a usage limitation that actually restricts what the metadata to pre-defined or permissible portions of the role hierarchy. In other words, some enterprises may not want to expose an entire role hierarchy for security reasons. In such a situation, a security policy may drive that a usage limitation permits the metadata to just include permissible portions of the role hierarchy.

It may also be the case, at 124 that the federated role-defining service provides a schema definition with the metadata. The schema definition may define the structure and components of the metadata (role hierarchy, role assignments, constraints, compliance and audit data). This may be useful when the service provider may not be preconfigured to deal with, handle, or interpret the metadata generated by the federated role-defining service. Thus, the metadata may include a XML schema definition (XSD), which the service provider can use to drive the dynamic translation and interpretation of the structure and content of the metadata.

In an embodiment, at 125, the federated role-defining service may define the constraints to indicate when particular role assignments are to be activated and also when particular assignments are to be deactivated within the remote environment. So, the constraints do not just provide directives to the service provider for dynamically binding a particular role assignment when defined conditions are met because the constraints also direct the service provider on when activated roles are to be decommissioned or deactivated. These constraints are interpreted and enforced by the service provider after the metadata is sent and within the remote environment of the service provider and where the resource is interacting.

At 130, the federated role-defining service sends the metadata to the service provider in the remote environment. The service provider uses the metadata to dynamically bind and resolve each role assignment for the resource. Some role assignments may never be activated; some may be activated and subsequently dynamically deactivated; multiple ones may be activated; etc. The point is that at least some role assignment binding to the identity of the resource is delayed and performed by the service provider via the metadata (role hierarchy, role assignments, and constraints). Additionally, the dynamic management of the roles that the resource can assume and may not assume can be managed within the remote environment by the service provider via the metadata. Examples of processing associated with the service provider and its use and management of the metadata is described more completely below with reference to the method 200 of the FIG. 2.

In some cases, at 140, the federated role-defining service may also subsequently and dynamically communicate with the service provider after the metadata is sent for the resource for purposes of informing the service provider when modifications, deletions, and/or additions are made to the metadata. In other words, the role hierarchy or particular constraints for a role assignment within the role hierarchy may be dynamically altered after the service provider has the metadata. The federated role-defining service is equipped to communicate these changes dynamically to the service provider so that near real-time changes to role provisioning can be made by the service provider.

The federated role-defining service assists a remote service provider in authenticating and defining a federated set of roles that a given resource may assume. The set of roles are organized as a hierarchy and includes role assignments (names) and constraints for satisfying each particular role assignment. Roles can be inherited, dynamically changed, added, and/or deleted. The format of the federated set of roles is represented in metadata, which a service provider is pre-configured to handle or can handle by virtue of a extensible language format, such as XACML, XML, usage of XSD, etc. Some roles may be activated by the federated role-defining service when policy permits and these activated roles may be identified in the metadata as being active. Other roles have delayed binding, such that the decision to bind a particular role is delegated to the service provider in the remote environment via dynamic interpretation of the constraints. The service provider may also decommission roles in response to the constraints and other policy.

Figure 2:
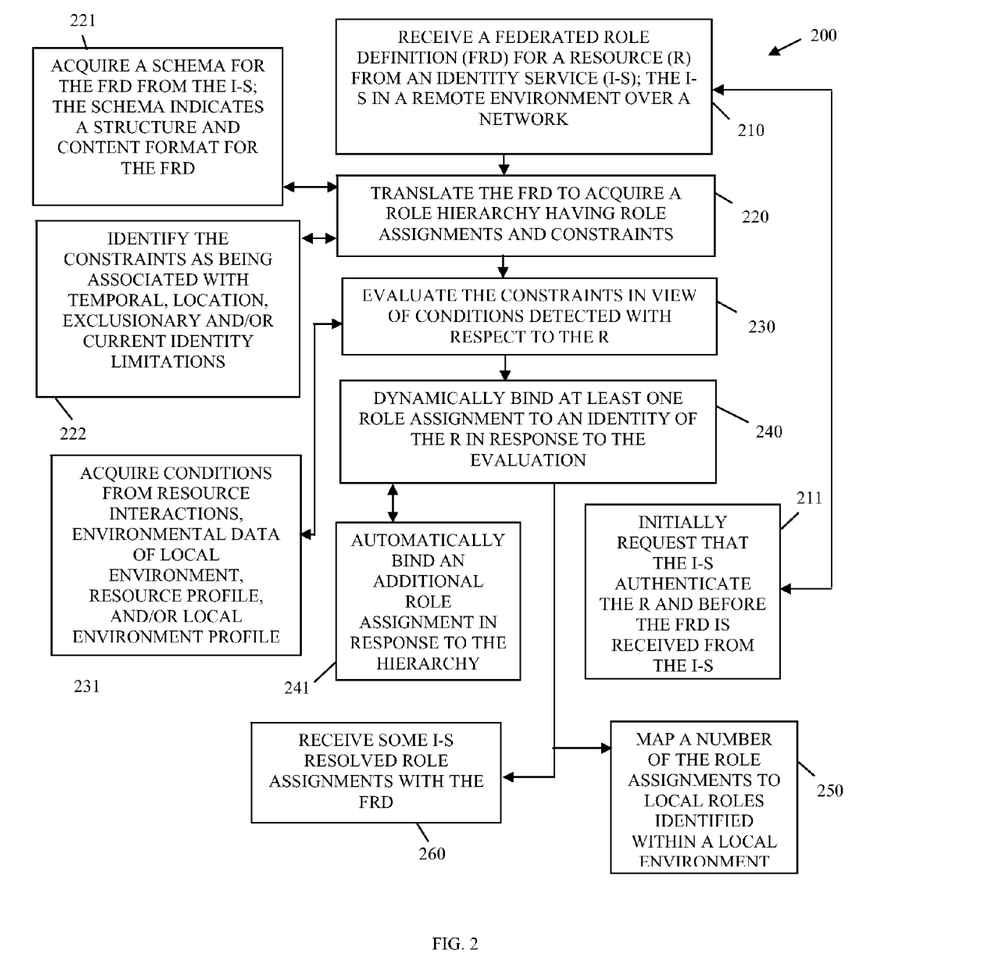
FIG. 2 is a diagram of a method for translating and using a federated role definition to bind role assignments to a resource, according to an example embodiment.

FIG. 2 is a diagram of a method 200 for translating and using a federated role definition to bind role assignments to a resource, according to an example embodiment. The method 200 (hereinafter "dynamic role-binding service") is implemented as instructions in a machine-accessible and readable medium. The instructions when executed by a machine perform the functions depicted in the FIG. 2. The processing is also operational over and performs within a network. The network may be wired, wireless, or a combination of wired and wireless. The dynamic role-binding service interacts with the role-defining service represented by the method 100 of the FIG. 1 to receive federated role definitions for a given resource. The manner in which that federated role definition is used and applied is more completely described herein and below.

The method 100 of the FIG. 1 defined a service, such as a modified identity service, that provides services to authenticate a resource and to provide metadata representing a federated role definition for the resource. The service provider discussed with reference to the method 100 may be viewed as the dynamic role-binding service and the federated role-defining service discussed above as being the method 100 may be viewed as the identity service discussed here with reference to the processing of the dynamic role-binding service.

At 210, the dynamic role-binding service receives a federated role definition for a resource from an identity service. The identity service is in a remote environment over a WAN connection, such as the Internet, from the dynamic role-binding service. The format and content of the federated role definition were discussed above as metadata with the method 100 of the FIG. 1.

In an embodiment, at 211, the dynamic role-binding service may have initially requested that the identity service authenticate the resource before the federated role definition is received from the identity service. This does not have to always be the case however. It may be that the dynamic role-binding service uses a local authentication service or identity service to authenticate the resource and the trust relationship between the local identity service or the dynamic role-binding service and the remote identity service permits the remote identity service to assume authentication of the resource and to supply the federated role definition for that resource.

At 220, the dynamic role-binding service translates the federated role definition for the resource to acquire a role hierarchy. The role hierarchy includes role assignments and each role assignment has logical relations to remaining role assignments within the role hierarchy. Additionally, each role assignment includes one or more constraints. The constraints may be viewed as the rules, logic, policy, etc. that when satisfied permit a particular role assignment to be bound to an identity associated with a resource or to be decommissioned or deactivated from its associated identity of the resource.

In an embodiment, at 221, the dynamic role-binding service may acquire a schema for the federated role definition from the identity service. The schema provides an automated mechanism for which the dynamic role-binding service can identify and recognize the structure and content format of the federated role definition. In other cases, the dynamic role-binding service may be preconfigured to recognize the structure and content format of the federated role definition received from the identity service.

According to an embodiment, at 222, the dynamic role-binding service may identify the constraints for the role assignments as being associated with a variety of types of limitations. For example, the constraints may be associated with temporal limitations that restrict role assignments to certain calendar dates, times of the day, etc. In still other cases, the constraints may be associated with location limitations that restrict role assignments to certain environments, devices, etc. In yet more situations, the constraints may be associated with exclusionary limitations that define conditions for which roles are to be decommissioned or deactivated. Another example of exclusionary limitations may be limitations associated with the RBAC Dynamic Separation of Duties (DSD). So, entity or resource responsibilities or duties can be distinctly segmented and distributed in an RBAC to multiple parties. It may also be that the constraints are used to define identity limitations to restrict role assignments based on identity associations.

At 230, the dynamic role-binding service dynamically evaluates the constraints included within the federated role definition in view of conditions detected with respect to the resource. That is, dynamic conditions are evaluated as the resource processes within the environment of the dynamic role-binding service. This may also entail evaluating policy discovered in response to evaluating the conditions.

At 231, the dynamic role-binding service may acquire the conditions in a variety of manners. For example, the conditions may be acquired from interactions with the resource, from environmental data associated with the local environment or with local devices within the local environment, from a profile associated with the resource, from a profile associated with the local environment or local devices within the local environment, etc. The exact conditions needed may also be derived or defined within the constraints themselves. For example, a constraint may indicate a particular role assignment cannot be made until 12:00 p.m.; in such a case the condition of time-of-day (environmental data in the local environment) is known based on the defined constraint. Policy may also define and drive the conditions needed and used to evaluate the constraints.

At 240, the dynamic role-binding service dynamically binds at least one role assignment to an identity of the resource in response to the evaluation at 231. In other words, the dynamic role-binding service dynamically binds a role to a resource (via a role assignment to the identity of the resource) by dynamically evaluating some of the constraints while the resource operates within the local environment associated with the dynamic role-binding service.

In some cases, at 241, the dynamic role-binding service may also dynamically bind at least one additional role assignment to the identity of the resource in response to the role hierarchy. In other words, a role assignment at 240 may be for a higher-level role within the role hierarchy that permits (perhaps via policy) a lower-level role within the hierarchy to be inherited and automatically assigned to the resource's identity.

According to an embodiment, at 250, the dynamic role-binding service may map a number of the role assignments that are dynamically bound to the identity of the resource to local roles identified and used within the local environment of the dynamic role-binding service. In other words, two enterprises may be collaborating with one another, and the federated role definition is supplied via a third-party service on behalf of both the enterprises or by just one of the enterprises participating in the collaboration. The specific role assignments that are determined to be permissible within the federated role definition may have another role name within the local environment of the other enterprise. Here, a mapping service or mechanism may be used to map these roles from the federated role definition to recognized and meaningful roles within the local environment.

It may also be the case, at 260 that the dynamic role-binding service receives the federated role definition for the resource with some roles assignments already activated or bound to the identity of the resource. Thus, there may be a separation of responsibilities for the federated role assignments, such that some roles are assigned or assignable by the remote identity service and other roles are dynamically assigned or assignable by the dynamic role-binding service. It may also be that the federated role definition or policy defines what entity may activate a particular role, such that the dynamic role-binding service may not permissibly activate some roles and the remote identity service may not permissibly activate other roles.

The dynamic role-binding service may also be used to dynamically monitor actions and conditions occurring within the local environment for purposes of decommissioning or deactivating roles assigned to the identity of the resource. Roles can be activated and deactivated on recurring bases. The dynamic role-binding service manages this situation via interactions with the identity service, policy interpretation, and the constraints defined in the federated role definition.

Figure 3:
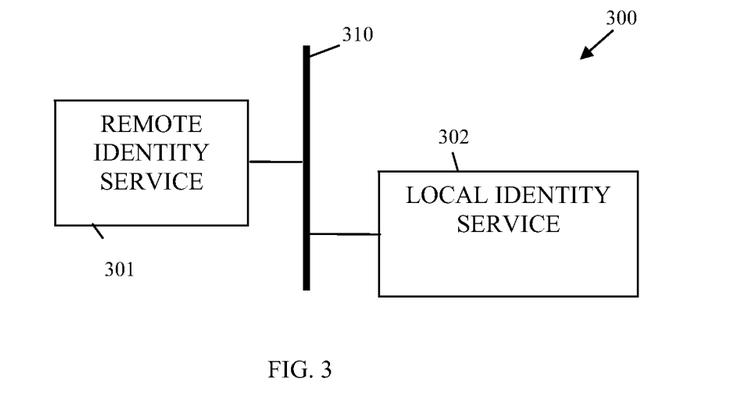
FIG. 3 is a diagram of a federated role provisioning system, according to an example embodiment.

FIG. 3 is a diagram of a federated role provisioning system 300, according to an example embodiment. The federated role provisioning system 300 is implemented as instructions in machine-accessible and readable media and is to process on multiple machines over a network. Thus, the federated role provisioning system 300 is operational over and performs within a network. The network may be wired, wireless, or a combination of wired and wireless. The federated role provisioning system 300 implements among other things the methods 100 and 200 of the FIGS. 1 and 2, respectively.

The federated role provisioning system 300 includes a remote identity service 301 and local identity service 302. Each of these and their interactions with one another over a wide area network (WAN) 310 connection will now be discussed in turn.

The remote identity service 301 is implemented in a machine-accessible medium and is to process on a remote machine within a remote environment over the network 310. The remote identity service 301 is remote and external relative to the local identity service 302. It is designated as being remote because it is not the environment in which a resource (e.g., user or automated program) interacts or seeks to acquire certain access rights and privileges.

The remote identity service 301 can provide authentication services to the local identity service 302 for purposes of authenticating a resource on behalf of the local identity service 302. Although this does not have to be the case; that is, the local identity service 302 may authenticate the resource independent of the remote identity service 301. However, the remote identity service 301 and the local identity service 302 are authenticated to one another and in a trusted and secure relationship with one another, which may entail encrypted communication over a secure or insecure channel of the network 310.

This trusted relationship permits the local identity service 302 to request that the remote identity service 301 generate a federated role definition for a given resource. The resource is identified by an identity, either supplied by the remote identity service 301 if it authenticates the resource or supplied by the local identity service 302 if the local identity service 302 authenticates the resource. The remote identity service 301 may interact with one or more additional services or repositories to assemble the federated role definition. Additionally, at least some of the role assignments included within the federated role definition are not activated or bound to the identity of the resource; rather, this occurs if at all via delayed binding within the local environment and by the local identity service 302.

The processing features associated with the remote identity service 302 were discussed in detail above with reference to the federated role-defining service represented by the method 100 of the FIG. 1. The federated role definition includes a role hierarchy having role assignments and each role assignment having one or more constraints that permit the local identity service 302 to subsequently dynamically resolve whether binding between an identity of the resource and a particular role assignment is to occur at all.

In some cases, the federated role definition may also define which entity (such as the remote identity service 301 or the local identity service 302) is permitted to activate a particular role. Thus, the federated role definition may include a delegation of duties as to who may activate roles for the resource.

According to an embodiment, the remote identity service 301 may also augment the federated role definition to include audit and compliance policy. The audit and compliance policy directs the local identity service 302 on what type of information to capture, track, and report with respect to role provisioning and role usage within the local environment.

The remote identity service 301 may also supply a schema for the federated role definition. The schema permits the local identity service 302 to dynamically recognize, translate, interpret, and process the structure and content associated with the federated role definition having the role hierarchy, role assignments, and role constraints.

The local identity service 302 is implemented in a machine-accessible and readable medium and is to process on a local machine within a local environment, which is local relative to the remote identity service 301. Again, the local identity service 302 interacts with the remote identity service 301 over the WAN 310 (such as the Internet).

The local identity service 302 requests from the remote identity service 301 a federated role definition for a resource and may also request authentication of the resource to obtain an initial unique identity for the resource. Once the federated role definition is received it is dynamically evaluated in view of conditions within the local environment with respect to the resource to at least dynamically bind one role assignment to the identity of the resource. Roles can be inherited via the hierarchy; can be decommissioned or deactivated; and can be dynamically bound. The local identity service 302 manages the lifecycle of role provisioning for the resource within the local environment via the federated role definition and policy.

Example processing associated with the local identity service 302 was described in detail above with reference to the method 200 of the FIG. 2.

Figure 4:
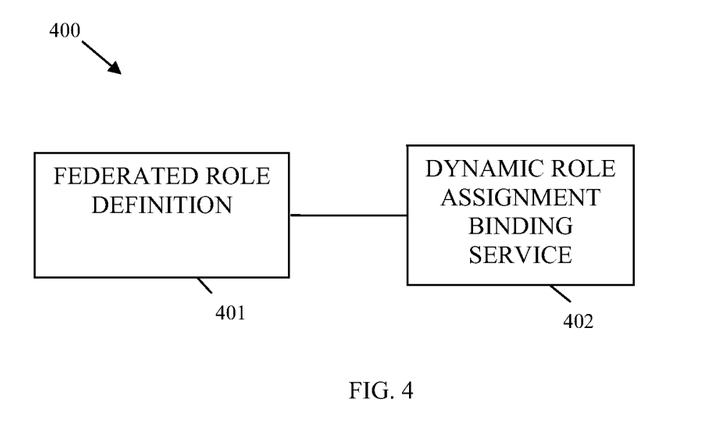
FIG. 4 is a diagram of another federated role provisioning system, according to an example embodiment.

FIG. 4 is a diagram of another federated role provisioning system 400, according to an example embodiment. The federated role provisioning system 400 is implemented within a machine-accessible and readable medium and may be processed on one or more machines. The federated role provisioning system 400 when executed by a machine performs, among other things, at least some of the processing depicted in FIGS. 1-3. Federated role provisioning system 400 is also operational over a network and the network may be wired, wireless, or a combination of wired and wireless. The federated role provisioning system 400 presents an alternative arrangement and perspective to the federated role provisioning system 300 presented with respect to the FIG. 3.

The federated role provisioning system 400 includes federated role definition 401 and a dynamic role assignment binding service 402. Each of these and their interactions with one another over a network will now be discussed in turn.

The federated role definition 401 is implemented in a machine-accessible and readable medium and is accessible to processes or services from machines of the network. In some cases, the federated role definition 401 may include executable portions or instructions that can be executed, such as for policy or constraints. Examples of a federated role definition 401 were described above with reference to the method 100 (metadata references) and the method 200 of the FIGS. 1 and 2, respectively.

The federated role definition 401 is assembled for a particular resource in response to a particular role provisioning request. A remote identity service or remote federated role defining service initially provides the federate role definition 401. The federated role definition 401 includes a role hierarchy, role assignments, and constraints. It may also include compliance and audit instructions. Additionally, it may be associated with or incorporate a schema that defines the structure and content format of the role hierarchy, role assignments (names), and constraints. The format of the federated role definition 401 may be in any proprietary format or in a portable or industry standard format such as, but not limited to, XML, XACML, etc. Moreover, the federated role definition 401 may include indications for roles that are activated already and for delegation of duties. In other words, some roles may require that a specific entity activate them and such requirement may be represented within the federated role definition 401.

According to an embodiment, the constraints may be logic and may define identity-based limitations for role assignments, location-based limitations for role assignments, event-based limitations for role assignments, and/or exclusionary-based limitations for role deactivation or role decommissioning.

In some cases, the federated role definition 401 includes an indication that at least some role assignments are already bound and associated with an identity associated with the resource before the federated role definition 401 is supplied to the dynamic role assignment binding service 402. That is, the identity service may initially bind some roles to the resource. Again, delegation of responsibilities may be defined via policy and may be represented within the federated role definition 401.

The dynamic role assignment binding service 402 is implemented in a machine-accessible and readable medium and is to process as instructions on one or more machines within a local environment within which a resource seeks role assignments for access to assets and other resources/devices/services within the local environment. The dynamic role assignment binding service 402 interacts over the network with the identity service to acquire the federated role definition 401.

The dynamic role assignment binding service 402 dynamically translates and interprets the federated role definition 401 to dynamically evaluate constraints and bind at least one role assignment to the resource (via the resource's identity). In some cases, role assignments may result in inherited roles that are automatically bound to the resource (as was discussed above). The dynamic role assignment binding service 402 may also decommission or deactivate roles.

Example processing associated with the dynamic role assignment binding service 402 was described in detail above with reference to the method 200 of the FIG. 2 and the system 300 of the FIG. 3.

It is now appreciated how a resource may have federated role provisioning occur with delayed and dynamic binding. This presents a variety of novel benefits such as, but not limited, to security integration and collaboration between disparate enterprises and/or processing environments.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A non-transitory computer-readable storage medium containing instructions for executing on a machine that is a computer, the instructions causing the machine to perform a method comprising:
   receiving, by the machine, a role request from a service provider, the role request associated with a resource, the resource interacting within a remote environment of the service provider;
   generating, by the machine, metadata representing a role hierarchy including a plurality of role assignments, the role assignments capable of including role constraints, the role hierarchy associated with the resource; and
   sending, by the machine, the metadata to the service provider, wherein the service provider processes the metadata representing the role hierarchy to dynamically resolve and bind at least one of the role assignments to the resource, the role hierarchy defining access to the resource within the remote environment and wherein the at least one of the role assignments has delayed binding by the service provider, the service provider capable of dynamically implementing the modifications, deletions, and additions to the role hierarchy, when received from the machine, and wherein the metadata is dynamically communicated by the machine to the service provider.

2. The method of claim 1, wherein generating further includes augmenting the metadata with audit and compliance policy directives for the service provider to adhere to when resolving and binding each of the role assignments for the resource.

3. The method of claim 1, wherein generating further includes adding descriptive information to the metadata to indicate usage limitations for each of the role assignments.

4. The method of claim 3, wherein generating further includes representing at least one usage limitation as a role-hierarchy limitation that restricts the metadata to just permissibly exposed portions of the role hierarchy in response to security policy.

5. The method of claim 1, wherein generating further includes providing a schema definition for translating and interpreting the metadata, wherein the schema definition is also sent with the metadata to the service provider.

6. The method of claim 1, wherein generating further includes defining the constraints to indicate when particular assignments are to be activated and when the particular assignments are also to be deactivated within the remote environment.

7. A non-transitory computer-readable storage medium containing instructions for executing on a machine that is a computer, the instructions causing the machine to perform a method comprising:
   receiving, by the machine, metadata comprising a federated role definition for a resource from an identity service over a network, the identity service residing in a remote environment over the network and wherein the identity service has already authenticated the resource when the federated role definition is received;
   translating, by the machine, the metadata comprising the federated role definition to acquire a role hierarchy having a plurality of role assignments, the role assignments capable of including role constraints, for the resource, wherein the roles associated with the resource are not automatically assigned to the resource, but rather the resource has to be bound to a particular identity to receive a particular role, wherein the resource has multiple identities, each identity acquired within a given processing context for the resource;
   evaluating, by the machine, the role assignments in view of a condition detected with respect to the resource;
   dynamically binding, by the machine, at least one role assignment to an identity associated with the resource in response to the evaluation of the role assignments, and wherein each role assignment defines access rights to a local environment associated with the resource and at least one role assignment has delayed binding to the identity of the resource;
   wherein the machine is capable of dynamically receiving the role hierarchy comprising modifications, deletions, and additions to the role hierarchy from the identity service, and the machine is capable of dynamically implementing said modifications, deletions, and additions to the role hierarchy when received from the identity service.

8. The method of claim 7 further comprising, mapping, by the machine, a number of the role assignments to local roles identified for the local environment.

9. The method of claim 7 wherein translating further includes acquiring a schema for the federated role definition from the identity service, wherein the schema indicates a structure and content format for the federated role definition.

10. The method of claim 7, wherein translating further includes identifying the constraints as being associated with one or more of the following: temporal limitations, location limitations, exclusionary limitations, and current identity limitations.

11. The method of claim 7, wherein evaluating further includes acquiring the conditions in response to one or more of the following: interactions with the resource, environmental data associated with the local environment, a profile associated with the resource, and a profile associated with the local environment.

12. The method of claim 7, wherein dynamically binding further includes automatically binding at least one additional role assignment to the identity in response to an assignment at a higher level in the role hierarchy thereby permitting role inheritance within the local environment.

13. The method of claim 7 further comprising, receiving, by the machine, some identity service resolved role assignments with the federated role definition, and wherein the federated role definition provides indications for assignments that the identity service can permissibly make and indications for the assignments that can be made independent and separate from the identity service.

14. A system, comprising:
a remote machine implementing a remote identity service within a remote environment; and
a local machine implementing a local identity service within a local environment, wherein the local identity service requests metadata comprising a federated role definition from the remote identity service for a resource operating within, or coupled to, the local environment, and wherein the remote identity service generates the metadata comprising the federated role definition to include a role hierarchy having a plurality of role assignments, the role assignment capable of including role constraints, and wherein the local identity service dynamically evaluates and binds the role assignments to an identity associated with the resource, wherein the role assignments are not automatically assigned to the resource rather the resource has to be bound to the identity to receive any particular role and the resource has multiple identities, each identity acquired within a given processing context for the resource and the role assignments define access permissions within the local environment and at least one of the role assignments has delayed binding, the remote identity service authenticates the resource before generating metadata comprising the federated role definition;
wherein the remote identity service is capable of dynamically communicating modifications, deletions, and additions to the role hierarchy to the local identity service, and local identity service is capable of dynamically implementing said modifications, deletions, and additions to the role hierarchy when received from the remote identity service.

15. The system of claim 14, wherein the remote identity service is to augment the federated role definition with audit and compliance policy, which the local identity service enforces within the local environment for the resource.

16. The system of claim 14, wherein the remote identity service is to supply a schema for the federated role definition to the local identity service, and wherein the local identity service is to use the schema to dynamically translate and use the role hierarchy, the role assignments, and the constraints.

17. The system of claim 14, wherein the federated role definition is to define a number of the role assignments that are to be permissibly resolved by the remote identity service and other ones of the role assignments that are to be permissibly resolved by the local identity service.

18. A system, comprising:
a machine generating metadata to provide a federated role definition, wherein the federated role definition includes a role hierarchy for a resource, the role hierarchy comprising a plurality of role assignments, the role assignments capable of including role constraints; and
at least one of another machine or the machine, implementing a dynamic role assignment binding service, wherein the dynamic role assignment binding service is to receive the federated role definition for the resource from an identity service, the identity service interacting with the machine, that initially authenticates the resource before the identity service provides the federated role definition to the dynamic role assignment service, and wherein the dynamic role assignment binding service is to dynamically bind at least one of the role assignments to an identity associated with the resource in response to a condition or activity associated with the resource after the federated role definition is supplied from the identity service and the at least one of the role assignments has delayed binding between the identity and the resource, and the role assignments are not automatically assigned to the resource rather the resource has to be bound to the identity to receive any particular role and the resource has multiple identities, each identity acquired within a given processing context for the resource;
wherein the dynamic role assignment binding service is capable of dynamically implementing the modifications, deletions, and additions to the role hierarchy when said modifications, deletions, and additions to the role hierarchy are received.

19. The system of claim 18, wherein at least some of the role assignments are already bound to the identity for the resource by the identity service when the federated role definition is supplied.

20. The system of claim 18, wherein some of the role assignments are automatically bound to the identity in response to a higher level binding within the role hierarchy thereby permitting role assignment inheritance via the role hierarchy.

21. The system of claim 18, wherein the constraints include limitations directed to one or more of the following: identity-based limitations, location-based limitations, event-based limitations, temporal-based limitations, and exclusionary-based limitations.

22. The system of claim 18, wherein the identity service is to remotely process over a wide area network separately in a remote environment from the dynamic role assignment binding service, which is to process within a local environment that is local to the resource.

* * * * *